Jan. 30, 1934.   H. LEITHÄUSER   1,945,281
EVAPORATING APPARATUS
Filed May 16, 1931
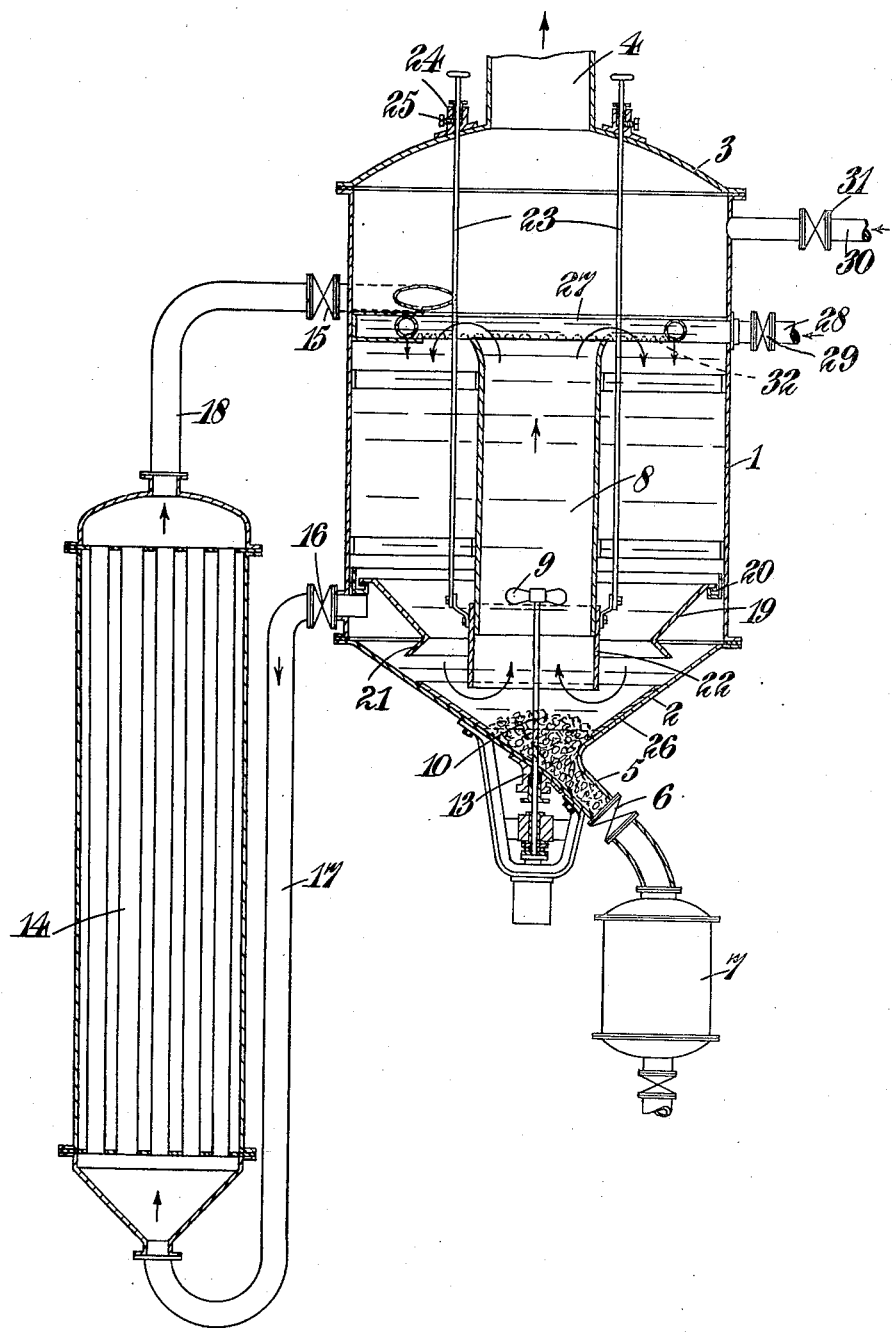
Inventor:
Hinz Leithäuser Patented Jan. 30, 1934

1,945,281

UNITED STATES PATENT OFFICE 1,945,281

EVAPORATING APPARATUS

Heinz Leithäuser, Essen on the Ruhr, Germany, assignor, by mesne assignments, to The Koppers Company of Delaware, Pittsburgh, Pa., a corporation of Delaware Application May 16, 1931, Serial No. 537,880, and in Germany May 15, 1930

3 Claims. (Cl. 159—45)

The invention relates to the recovery of coarse crystalline ammonium sulphate and similar salts from their solutions in vessels in which the solutions are evaporated (preferably at sub-atmospheric pressure) and provided with means for the intermittent or continuous removal of the salt crystals which settle out.

In evaporators of types hitherto proposed the crystals recovered are in a very finely granular form. Such a salt is not commercially useful as a fertilizer owing to the fact that it is easily blown away by the wind when being strewn over the field.

The present invention relates to a process for the manufacture of coarse crystalline ammonium sulphate and similar salts from their solution in an evaporating apparatus, in which while the salt solution is being evaporated in the crystallizing vessel such a movement of the liquid is caused that the seed crystals formed and the smaller crystals are kept in suspension in the salt solution, and only the larger crystals, after they have attained a definite size, can settle at the bottom of the crystallizing vessel.

According to the invention an apparatus for carrying out the above process comprises a crystallizing vessel in which is arranged below the level which the liquid is to occupy, a vertical circulating pipe which is open at the top and bottom and within which is provided means for circulating the liquid so that the liquid flows continuously in at the lower end and flows out at the upper end. Preferably the crystallizing vessel is provided with a slightly conical bottom.

In one form of the invention such a liquid circulation within the solution to be evaporated through the conducting pipe may also be augmented by thermosiphon action, by means of heating elements or by blowing-in steam. By the latter operations the concentration of the solutions for separating out the salts is obviously facilitated.

The invention further relates to an evaporator which will be described hereinafter with the aid of the annexed drawing.

The figure shows a vertical longitudinal section through the evaporator provided with conducting pipe and a stirring propeller whereby the circulation of the liquid is effected.

A cylindrical container 1 serves as the crystallizing vessel; the bottom 2 thereof is slightly conical and its cover 3 is provided with a discharge opening 4 for the vapours escaping from the solution to be evaporated.

In case the evaporation is carried out at a decreased pressure, the pneumatic pump which serves to produce the vacuum is joined to the discharge opening. A draw-off pipe 5 is situated at the lowest point of the bottom 2 of the container; the said pipe is closed by a closing element 6 to which there is joined the usual settling vessel 7 in which the crystals taken off through the pipe 5 are separated from the mother liquor entrained. A circulating pipe 8 which is open above and below is arranged with a vertical longitudinal axis in the crystallizing vessel 1 within the solution to be evaporated, the diameter of which pipe is so large that there is space in its interior for a stirrer 9 rotatable about a vertical axis. The latter, the blades of which are formed so that the liquid is moved in the direction of the axis of rotation, is mounted at the end of a spindle 10 which passes through the bottom of the container. The said spindle is in power-conducting connection outside of the container with a driving element (electromotor or the like). The opening passage of the stirring spindle 10 is tightened off below by means of a stuffing box 13.

The salt lye is heated in the evaporating apparatus illustrated by hot gases produced in a furnace which is not shown in known vertical tubular heaters 14 constructed separately from the crystallizing vessel proper. The tubular conduits 17 and 18 controlled at the lower and upper end by closing members 15 and 16 are in connection with the crystallizing vessel; the upper tubular conduit 18 ending above the liquid level in the container, while the lower connecting pipe 17 is joined in the vicinity of the bottom of the vessel. Within the crystallizing vessel there is arranged in front of the openings of the lower heating connecting pipe 17 an annular shaped baffle 19 which is conically tapered in a downward direction and is loosely suspended in hook projection 20 to the lateral wall of the vessel. The upwardly bent lower edge 21 of the conical baffle 19 is at such a distance from the bottom 2 of the vessel that the velocity of flow of the salt lye through the annular slot between the baffle and the bottom of the vessel is so great while the apparatus is in operation that only the large crystals can settle at the bottom of the vessel, the small crystals being passed with the liquid through the tubular conduit 17, heater 14 and conduit 18 back to the crystallizing vessel 1, as owing to the heating of the liquid in the heaters 14 there is a continuous circulation of the liquid.

The lower passage opening between the conducting pipe 8 and the bottom 2 of the crystallizing vessel is moreover adjustable. This may be effected by displacing the whole conducting pipe in the axial direction. In the apparatus illustrated in the drawing the pipe 8 is arranged telescopically so that a tubular element 22 is passed over the pipe 8 at the lower end and is secured to supporting rods 23 which are vertically movable in guiding blocks 24 on the cover 3 of the container and can be secured from the exterior at the desired level by means of set screws 25. By vertically moving the supporting rod 23 the lower tubular element 22 of the conducting pipe 8 may be brought nearer, as desired, to the conically shaped bottom 2 of the container or may be entirely withdrawn over the pipe 8. Thus, the intensity of the movement of the liquid, more particularly the velocity of the circulating current above the coarse crystals which settle on the bottom of the container may be regulated to such an extent by a suitable adjustment of the level of the lower part of the conducting pipe that only the crystals of the size desired at each cycle of the liquor are prevented from being entrained by the liquid stream and settle at the bottom of the vessel or at the aperture of the salt-discharging pipe.

A false bottom 26 is also provided at the bottom 2 of the container, which false bottom consists of a metal which is harder than that forming the bottom of the crystallizing vessel. This arrangement has the advantage that the false bottom can be readily renewed as owing to the salt current which circulates between the end of the conducting pipe and the bottom of the vessel, the metal bottom below the conducting pipe is subjected to heavy wear and consequently is worn out in a comparatively short time.

Further, the liquid circulation may also be produced by blowing in steam, preferably superheated steam or air. In the evaporating apparatus illustrated in the drawing the arrangement of such an air or steam blowing-in conduit is shown within the crystallizing vessel. The circulation may be produced therefore either by the said steam blowing-in device or the stirring propeller 9 or both together. The steam or air distributor 27 is arranged above the conducting pipe 8 and is joined at the exterior to an admission conduit 28 which is controlled by a closing member 29. The distributor 27 is provided with downwardly directed openings 32 through which the media introduced under pressure issue and thus bring about a circulation of the lye. Owing to the use of super-heated steam or hot air there is produced in addition to a satisfactory eddying of the small crystals in the solution a more rapid concentration of the solution.

Moreover, the media which effect the circulation may also be blown into the conducting pipe from below. The admission conduit 30 which is arranged at the top on the container 1 and in which a closing member 31 is built serves for supplying fresh quantities of salt solutions to be evaporated.

I claim:—

1. Evaporating apparatus for the recovery of solid ammonium sulphate and similar salts from solutions comprising, in combination: a crystallization vessel; a vertical circulation pipe arranged in said vessel below the level to which the liquid is to occupy therein and open at its top and bottom; rotary liquid-circulation means arranged in line with said pipe for causing a regulable upward flow of liquid therein so as to cause a circular current through the circulating pipe and down through the space between the vessel and the pipe and thereby keep seed crystals in suspension in the liquid until they attain a definite size; the bottom of said vertical pipe terminating at a spaced distance above the bottom of said vessel and the rotary liquid-circulation means being disposed at a spaced distance above the bottom of the vessel so as to be above the lower end of the liquid circulation pipe; and an annular baffle tapering conically downwards towards the recirculation pipe and arranged between the sides of said pipe and said vessel near the lower end of said pipe.

2. Evaporating apparatus as claimed in claim 1, and in which heating means for heating the liquid are provided outside the vessel and connected therewith for thermosiphon circulation between the heating means and the vessel.

3. Evaporating apparatus for the recovery of solid ammonium sulphate and similar salts from solutions comprising, in combination: a crystallization vessel; a vertical circulation pipe arranged in said vessel below the level to which the liquid is to occupy therein and open at its top and bottom; rotary liquid circulation means arranged in line with said pipe for causing a regulable upward flow of liquid therein so as to cause a circular current through the circulating pipe and down through the space between the vessel and the pipe and thereby keep seed crystals in suspension in the liquid until they attain a definite size; the bottom of said vertical pipe terminating at a spaced distance above the bottom of said vessel and the rotary liquid-circulation means being disposed at a spaced distance above the bottom of the vessel so as to be above the lower end of the liquid circulation pipe; and an annular baffle tapering conically downwards towards the recirculation pipe and arranged between the sides of said pipe and said vessel near the lower end of said pipe, said baffle thence extending downwardly and outwardly towards the vessel so as to confront a liquid outlet leading to a heater for the liquid.

HEINZ LEITHÄUSER.